US012154556B2

(12) United States Patent
Camenares et al.

(10) Patent No.: US 12,154,556 B2
(45) Date of Patent: *Nov. 26, 2024

(54) SYSTEM AND METHOD FOR ELECTRONIC COMMUNICATION

(71) Applicant: Capital One Services, LLC, McLean, VA (US)

(72) Inventors: Christopher Camenares, Falls Church, VA (US); Joseph Boayue, Reston, VA (US); Lee Adcock, Midlothian, VA (US); Ana Cruz, Arlington, VA (US); Nahid Farhady Ghalaty, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,789

(22) Filed: May 9, 2023

(65) Prior Publication Data

US 2023/0282207 A1  Sep. 7, 2023

Related U.S. Application Data

(63) Continuation of application No. 16/876,955, filed on May 18, 2020, now Pat. No. 11,682,386.

(51) Int. Cl.
| | |
|---|---|
| *G10L 15/00* | (2013.01) |
| *G06N 5/02* | (2023.01) |
| *G10L 15/18* | (2013.01) |
| *G10L 15/22* | (2006.01) |
| *G10L 15/30* | (2013.01) |

(Continued)

(52) U.S. Cl.
CPC ............ *G10L 15/1815* (2013.01); *G06N 5/02* (2013.01); *G10L 15/22* (2013.01); *G10L 15/30* (2013.01); *H04L 51/04* (2013.01); *H04L 67/306* (2013.01)

(58) Field of Classification Search
CPC ........ H04M 3/523; G10L 15/30; G10L 15/26; G10L 15/22; G10L 15/1815; H04L 51/04; H04L 67/306; H04L 51/02; G06F 40/295
USPC .......................................... 704/235
See application file for complete search history.

(56) References Cited

U.S. PATENT DOCUMENTS 10,515,151 B2 * 12/2019 Hebert ................. G06F 40/295
11,227,126 B2 *  1/2022 Rakshit ................ G06F 40/295
(Continued)

*Primary Examiner* — Md S Elahee
(74) *Attorney, Agent, or Firm* — Foley & Lardner LLP

(57) ABSTRACT

Systems, methods, and computer-readable storage media for providing communication recommendations to users. The system receives electronic transcripts associated with a first user and generates, based on the transcripts, a communication profile of the user. The system also receives additional user transcripts associated with a plurality of additional users and generates additional communication profiles for those additional users based on the additional transcripts. The system receives a request to communicate with at least one user within the plurality of additional users regarding a specified topic, identifies a second user from within the plurality of additional users, and generates a communication initiation recommendation for the first user to communicate with the second user. The system then transmits the communication initiation recommendation to a first user computing device associated with the first user.

20 Claims, 5 Drawing Sheets

(51) Int. Cl.
 *H04L 51/04* (2022.01)
 *H04L 67/306* (2022.01)

(56) References Cited

U.S. PATENT DOCUMENTS

| | | | |
|---|---|---|---|
| 2016/0205254 A1* | 7/2016 | Luers | H04M 3/523 |
| | | | 379/265.14 |
| 2016/0259789 A1* | 9/2016 | Shrinath | G06F 17/3053 |
| 2020/0342032 A1* | 10/2020 | Subramaniam | G06F 16/90332 |

* cited by examiner

SYSTEM AND METHOD FOR ELECTRONIC COMMUNICATION

CROSS-REFERENCE TO RELATED APPLICATIONS

This application is a continuation of U.S. patent application Ser. No. 16/876,955, filed May 18, 2020. The content of the foregoing application is incorporated herein in its entirety by reference.

BACKGROUND INFORMATION

1. Technical Field

The present disclosure relates to text autofill between users before electronic dialogue begins, and more specifically to improved autofill and autocomplete systems for electronic communication systems.

2. Introduction

Autocomplete and autofill systems can provide basic information for insertion into electronic communications. While in some cases autocomplete suggestions can provide a suggestion of how to reply to an email or text message, such systems are responsive to previous communications and do not suggest how to initiate communications. In addition, typical autocomplete suggestions are not customized to a user, and often fail to capture a user's voice in replying. Furthermore, autocomplete suggestions fail to take into account how the recipient of a message is likely to respond to the suggested message.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media a technical solution to the technical problem described. An electronic messaging method for performing the concepts disclosed herein can include receiving, at a server, first electronic transcripts associated with a first user; generating, via a processor associated with the server and based on the first electronic transcripts, a first user communication profile, the first user communication profile comprising a data structure, the data structure associating the first user with user information comprising (1) topical expertise, (2) language fluency, (3) avoided topics, and (4) preferred topics; receiving, at the server, additional user transcripts associated with a plurality of additional users; generating, via the processor and based on the additional user transcripts, additional communication profiles for each user in the plurality of additional users; receiving, at the server from the first user, a request to communicate with at least one user within the plurality of additional users regarding a specified topic; identifying, via the processor in response to the request, a second user from within the plurality of additional users; generating, via the processor, based at least in part on: (1) the first user communication profile, (2) a second user communication profile associated with the second user, and (3) the specified topic, a communication initiation recommendation for the first user to communicate with the second user, the communication recommendation comprising suggested text for the first user to send to the second user; and transmitting the communication initiation recommendation to a first user computing device associated with the first user.

A system configured to perform the concepts disclosed herein can include a processor; and a non-transitory computer-readable storage medium having instructions stored which, when executed by the processor, cause the processor to perform operations including: receiving, from an input device, a query for an expert regarding a specified subject; identifying, from within a plurality of electronic transcripts associated with a plurality of individuals, a plurality of individuals who have discussed the specified subject; ranking the plurality of individuals as experts based on a number of incidents within the plurality of electronic transcripts each individual in the plurality of individuals has had directed to the specified subject, resulting in a ranked list of experts; transmitting, from the server to the input device in response to the query, the ranked list of experts; receiving, from the input device, a selection of a selected expert from the ranked list of experts; modeling, based on a first profile of a user of the input device and a second profile of the selected expert, a plurality of conversations between the user and the selected expert associated with the specified subject, resulting in a ranked list of conversation openers, the ranked list being ranked according to which conversations best engaged both the user and the selected expert; and transmitting, to the input device, an introduction recommendation for starting communications with the selected expert based on a top conversation in the ranked list.

A non-transitory computer-readable storage medium configured as disclosed herein can have instructions stored which, when executed by a computing device, cause the computing device to perform operations which include receiving, from a first user, a first plurality of previous communications, the first plurality of previous communications comprising text exchanges between the first user and previous matches of the first user; generating a first user communication profile based on the first plurality of previous communications; receiving, from a second user, a second plurality of previous communications; generating a second user communication profile based on the second plurality of previous communications, the second plurality of previous communications comprising text changes between the second user and previous matches of the second user; receiving, from the first user, a first signal indicating a desire to communicate with the second user; receiving, from the second user, a second signal indicating a desire to communicate with the first user; and upon receiving the first signal and the second signal: modeling a plurality of opening lines from the first user to the second user based on the first user communication profile, wherein each opening line in the plurality of opening lines results in a plurality of response lines based on the second user communication profile; identifying, based on the modeling and a goal of the first user, a top ranked line in the plurality of opening lines; transmitting the top ranked line to the first user; transmitting at least a portion of the first user communication profile to the second user; and transmitting at least a portion of the second user communication profile to the first user.

DETAILED DESCRIPTION

Figure 1:
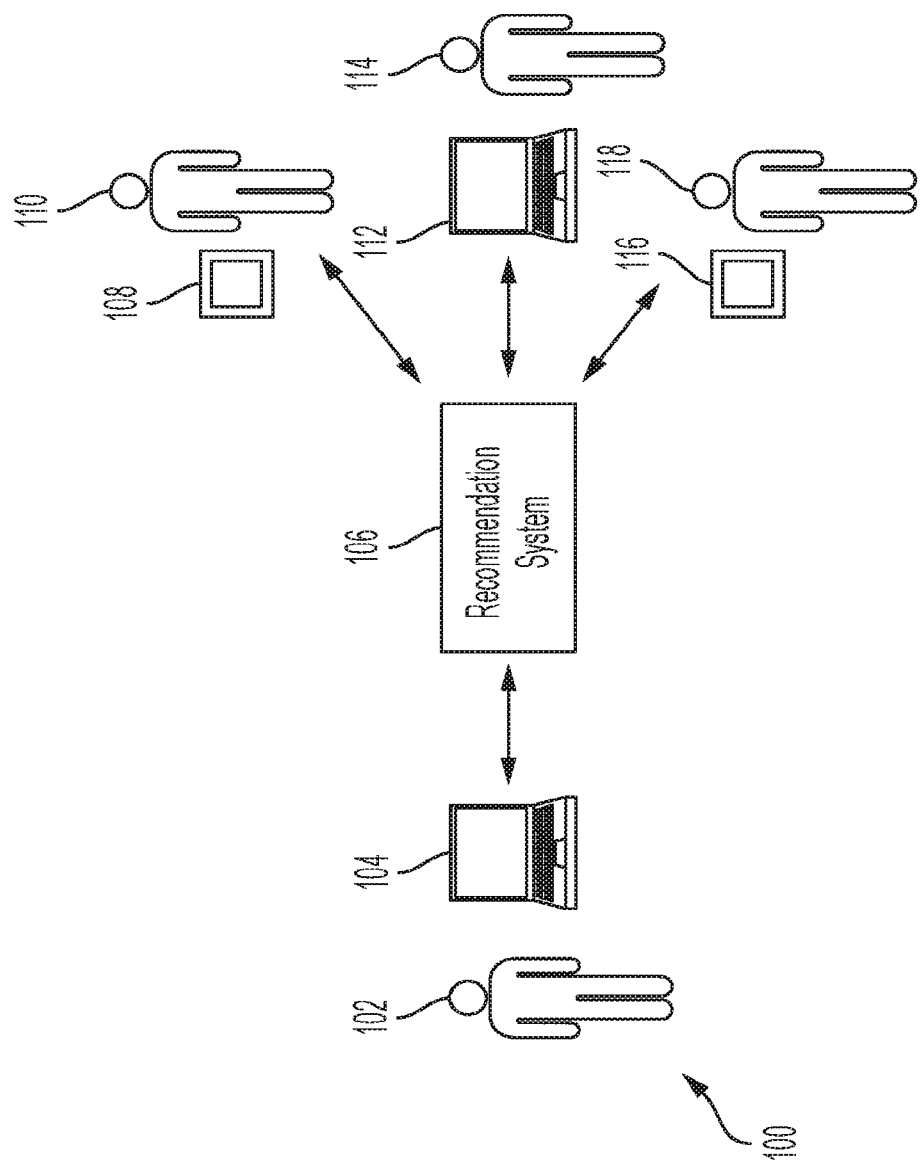
FIG. 1 illustrates an example recommendation system initiating communications between a user and multiple other individuals.

Various embodiments of the disclosure are described in detail below. While specific implementations are described, it should be understood that this is done for illustration purposes only. Other components and configurations may be used without parting from the spirit and scope of the disclosure.

Systems, methods, and computer-readable media disclosed herein provide automated electronic communication recommendations to users. Exemplary, non-limiting examples of the automated electronic communication recommendation include providing a suggestion for who the user should to talk to for a given subject and/or providing a suggested opening line to a user for communicating with another individual. The system disclosed herein uses communications (texts, emails, transcripts derived from speech-to-text processing) to develop communication profiles of both parties—the initiator of the new conversation and the recipient of the communication message. The system can then use the communication profiles to determine who would effectively communicate with the initiator, and how the initiator should communicate with the identified parties so that the conversation proceeds in a manner which would achieve the initiator's goals.

Consider the following example. Electronic communications typically include combination of an instant messenger and/or email. Digital conference calls may also be recorded by the system, the digital audio recordings of the conference calls converted from speech to text, the resulting text parsed using natural language processing, and the parsed text organized into tagged communications based on the contexts of the conference calls, speakers, parties, etc. For example, the parsed text can be tagged with metadata indicating a domain, topic, speaker, commonly used vocabulary, rarely used vocabulary, etc. In addition, using the tagged communications obtained from communication systems such as instant messenger, email, and conference calls, the system can generate a communication profile for a user, where the communication profile identifies aspects of how the user prefers to communicate based on the tagged, parsed communications. More specifically, the system can count a number of times the user uses specific vocabulary, timing of responses, topics which cause the user to increase/decrease participation (as measured by the number of interactions counted by the system), etc. Examples of information contained within the communication profile (and which are extracted from the tagged, parsed communications) can include preferred language, normal response time, preferred sentence length, preferred topics/expertise for the user, vocabulary/slang, etc. Additional information contained within the communication profile can include demographic information, such as gender, age, and/or physical location; job information, such as job title, organization, supervisors, etc.; speech characteristics, such as prosody, speech impediment; and/or responsiveness to previous communications based on context, person delivering the communication, time of day of the communication, length of the communication, etc.

Continuing with the example, someone within an organization desires information or an answer to a question about a particular topic "X." A search request for experts in "X" is received by the system, and the system identifies one or more individuals within his organization who are "X" experts on the topic. For example, based on the topic "X," the system can identify, within a personnel database, certain attributes of individuals (such as certificates, credentials, experience, or years of experience) which qualify those individuals as experts, and receive communication profiles for those experts. The system compares the communication profiles of those identified "X" experts to the user's profile, identifying who is a best match. In some configurations, the experts can be ranked based on the comparison. The system can also provide information that would help the user communicate effectively with the respective experts. In some cases, that assistance can take the form of the system providing the communication profiles of the experts to the user, or at least a portion of their communication profiles depending on any privacy limitations the respective experts may have.

Another form of assistance the system can provide are suggested communications for the user to send to chosen experts to achieve a goal set by the user. That is, if an expert the user wishes to communicate with prefers short sentences, the system can provide example short suggestion sentences which the user can use to introduce himself to the respective expert in a manner which is most likely to elicit a positive (from the user's point of view) response. To generate the suggestion sentences, the system can model multiple conversations based on previous communications with the expert. In some configurations, the multiple conversations modeled can be ranked, such that the system selects the conversation most likely to engage both the user and his selected expert. Level of engagement can be predicted, for example, based on a predicted duration of the conversation, contextual similarity to previous conversations, non-contextual similarity to previous conversations (e.g., time of day, day of week, relationship to the conversation initiator, etc.).

As the user engages with the expert, regardless of whether the user uses the provided suggestions or not, aspects of the conversation are recorded, parsed, and logged, then used as historical data for analysis in future communications. In some configurations, the logged data can also be used to update the code used to generate the suggestions, such that with each iteration the system improves its ability to provide recommended communications to the user. More specifically, the system can use data about which recommendations are used (context, length/brevity, syntax, etc. of the actual recommendation, as well as any similarity of the actual communication to the recommended communications) and data about how the actual communication is received (such as does the recipient provide any response whatsoever, a brief response, an off-topic response, a speed of the response, etc.) to modify the recommendation code being executed by the system.

With that general example provided, the disclosure turns to the specific examples provided by the illustrations.

FIG. 1 illustrates an example recommendation system 100 initiating communications between a user 102 and multiple other individuals 110, 114, 118. In this example, the user 102 is interacting with a personal computer 104 and needs help with a given task. The user 102 enters a request for help with the given task into their personal computer 104, which transmits the request to the recommendation system 106. The recommendation system 106 can operate on, for example, a server connected to a communication network, a single computer electrically connected with multiple other computer devices 104, 108, 112, 116, a cloud-based computing system, etc. The recommendation system 106 evaluates a communication profile of the user 102, identifying how the user 102 communicates. For example, the communication profile can indicate syntax, prosody, vocabulary, duration/length of communications, response rates, job title, and/or common contexts of the user 102, based on previous communications of the user. The communication profile can be generated from, for example, emails, text messages (SMS messages), instant messages, and/or electronic transcripts generated using speech-to-text prosody from recordings of conference calls and/or other meetings. Communication profiles can, for example, be stored in a database, and associated/organized within the database based on various parameters such as engagement style of the associated user, areas of expertise, syntax, prosody, vocabulary, duration/length of communications, response rates, job title, and/or common contexts of the user 102. Retrieval of the communication profile from the database can occur when a user 102 logs into their computer 104, or when the user 102 engages with their computer 104 in a manner which results in the computer 104 communicating with the recommendation system 106. In other words, in some configurations, the communication profile is retrieved from the database immediately upon a user 104 "logging in" to their computer 104, whereas in other configurations the recommendation system 106 waits to retrieve the communication profile until the user 104 engages with the recommendation system 106.

The recommendation system 106, in looking for help for the user's 102 task, can retrieve similar communication profiles for multiple other individuals 110, 114, 118 within a given organization. The system 106 can identify, based on a comparison of the communication profiles of the other users 110, 114, 118 to the communication profile of the user 102 and the context of the request for help, which individuals within the organization may be best able to assist the user 102. The recommendation system 106 can then rank those matched individuals. For example, the system 106 can rank the matched individuals, using their communication profiles, based on aspects such as: how often they have interacted with the user 102 in the past; how often they speak on the topic the user 102 needs help with; how fast they have previously responded to other communications in general; how fast they have previously responded to communications based on areas such as topic, other parties in the communication, respective job titles/locations within the organization, time of day, day of week.

The system 106 can provide to the user 102, via the user's device 104, the list of potential individuals, and the user 102 can select to interact with a given individual 114. The recommendation system 106 can then provide initial communication recommendations (e.g., opening lines) tailored to the user 102 and the selected individual 114, based on both the communication profiles of the parties 102, 114, as well as the topic being discussed. The user 102 can then transmit, from their device 104 to the selected user's 114 device 112, a message, which may be the recommended message, a modified version of the recommended message, or an entirely different message drafted by the user 102. The message sent can be an email, text message, instant message, voice message, or any other type of communication which can be sent electronically through a network, or which can be converted from speech to text, such that the communication can be analyzed by the recommendation system for future improvements to the recommendation system code/architecture.

Figure 2:
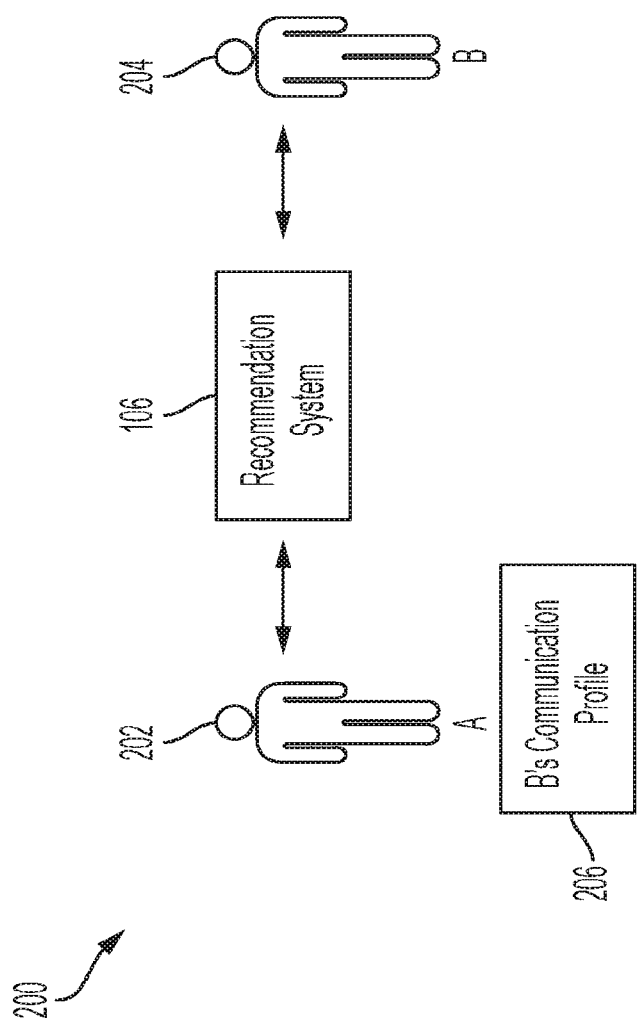
FIG. 2 illustrates an example recommendation system initiating communications between two individuals.

FIG. 2 illustrates an example 200 recommendation system 106 initiating communications between two individuals 202, 204, where the user 202 initiating the communication has access to at least a portion of the intended recipient's 204 communication profile 206. In this example 200, the user 202 has already determined that they wish to interact with the intended recipient 204, and the system 106 is providing tips or advice on how to go about communicating with the intended recipient 204. The tips or advice provided by the system 106 can, for example, be generated based on a list of expressions, introductions, pre-generated phrases, opening statements used previously by other the user 202 or other users, and/or other ways of initiating communication. Each communication item in the list can have rankings for how individuals associated with specific characteristics listed in the communication profiles have previously responded to the respective communication item and/or communication items calculated to be similar (based on length, vocabulary, domain, etc.) to the respective communication item. For example, if a certain user B 204 received a communication with "Hi B, can we talk?" and user B 204 never responded to the communication, the database can have an entry such as "can we talk?" with low rankings associated with the characteristics associated with user B's communication profile. However, if user B 204 were to receive the same communication at a second time and then user B 204 responded, the system can update rankings about the likelihood of a response from someone like user B 204 based on the distinct circumstances of the second instance.

The communication profile 206 of the intended recipient 204 displayed to the user 202 can be limited to aspects selected by the recipient 204. For example, if the intended recipient 204 does not want a given aspect of their profile revealed to others, they can prohibit the system from sharing that aspect. For example, if the recipient 204 does not want the system 106 to reveal that they never respond to emails or phone calls on Friday afternoon, the recipient 204 can block that aspect of their communication profile 206 from being shared. To enable this feature, the users, both those initiating a communication and recipients of communications, can have access to their communication profiles and edit aspects of those profiles based on personal privacy decisions. Continuing with the "Friday afternoon" example, the recipient 204 could view their communication profile and, while the recipient 204 would see that such a conclusion is part of their profile based on their previous interactions and communications, the recipient 204 can block others from seeing that feature. In some configurations, managers and other supervisors may have complete access to user's communication profiles, regardless of user preferences, such that supervisors can make team management decisions based on that data.

In addition to initiating communications, FIG. 2 can also be applied to situations where a user 202 has already initiated some form of communication and wishes to continue effectively communicating with the recipient 204. That is, the recommendation system 106 can be applied to more than just initiating conversations—the system 106 can continue providing the respective user's 202, 204 communication profiles to the other parties, such that both parties (the initiator 202 and the recipient 204) can view how the other party prefers to communicate and what would constitute an effective communication with that party. In addition, the recommendation system 106 can continue to provide recommendation communications to the respective users 202, 204 beyond the introduction.

In some configurations, the providing of recommendation communications can require the users 202, 204 to input goals or objectives that they wish to achieve, whereas in some configurations the system 106 can interpret the goal or objective based on a relationship between the parties and/or a context of a previous communication. Continuing with the work example, the users 202, 204 may have previously entered that they wish to communicate as efficiently/quickly as possible, with little or no downtime/delay, and provide recommended communications based on those stated goals. In other circumstances, where the users have distinct goals, the system can seek a compromise or balance between the respective goals and objectives of each party. In such cases, the system may, for example, weight the respective goals of each user and provide communication recommendations which neither completely satisfy nor completely antagonize either user. If, for example, one user prefers a long communication and another prefers a short communication, the system can recommend a medium length communication. In some cases, the goals and objectives of the parties can be communicated to the other individuals as part of the user's communication profile.

FIG. 2 can also be used to illustrate the use of the recommendation system in communicating with strangers when the respective parties have commonly indicated an interest in communicating with one another. For example, dating and other introduction applications, such as TINDER and BUMBLE, allow users to indicate their interest in a given party by swiping. When both parties have indicated a desire to match with the other individual, a notification is communicated to both parties. With the recommendation system 106 disclosed herein, a user 202 considering initiating communications with the other party 204 can view at least a portion of the other user's 204 communication profile 206. For example, the communication profile 206 may recommend, based on the user A's 202 goals and user B's 204 communication profile 206, that user A 202 lead with a joke or a compliment because statistically user B 204 is more likely to respond positively to such a communication. Moreover, the recommendation system 106 may provide example jokes or compliments as recommended communications for the user 202 to use. In this manner, the system 106 can provide tailored assistance to those who may struggle communicating effectively, where the tailored assistance is based on a combination of the user 202, the user's goals, the user's communication profile, and/or the recipient's 204 communication profile 206.

In generating the recommendation communications, the system can model a proposed communication's response based on how the user has responded to similar communications in the past. The modeling performed by the recommendation system 106 can evaluate multiple possible communications, ranking those possible communications based on a favorable result, where a favorable result is based on the user's goals, and provide the highest ranked proposed communication or communications to the user. These possible communications can be based on previous communications used by individuals, recorded by the system, and subsequently analyzed by the system. In other instances, the possible communications can come from Internet or third-party network-based communications, where the system identified a response was generated to a communication similar to the topic or domain in question. However, in those cases the system would not be able to initially provide information regarding how that communication was received by the respective parties. In some cases, the system can also use the past behavior of similar users to evaluate how the user is likely to respond. For example, if the initiator 202 is considering sending a joke, the system might recognize that that particular joke has been sent before to this same recipient, and inform the user that the likelihood of a favorable response is small. Alternatively, the system might model how the same joke has been received by similar users and, based on the recipient's communication profile, how the recipient is likely to respond to the joke. In other words, the communication profile 206 can also reflect similar users and how those similar users have responded in the past. Similar users can be identified based on job titles, demographics (gender, socio-economic status, etc.), education, age, geographic location, birth place, native language, etc.

Figure 3:
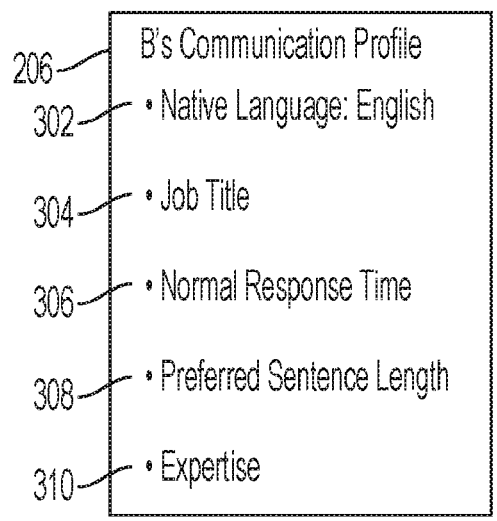
FIG. 3 illustrates an example communication profile.

FIG. 3 illustrates an example communication profile 206. In this example, the profile contains data extracted from previous user communications, such as emails, text (SMS) messages, instant messages, transcribed audio, and/or other communications. The communications are subjected to natural language processing and/or statistical analysis to identify contexts, vocabulary, syntax, and/or other aspects of how the individual communicates. The illustrated communication profile 206 identifies the user's native language 302, job title 304, normal response time 306, preferred sentence length 308, and areas of expertise 310. Other exemplary data which could be included within a communication profile 206 can include the user's goals, patterns in responding (how often do they ignore communications), organization chart, use of emojis, and frequent communication partners (e.g., who the user frequency communicates with).

Figure 4:
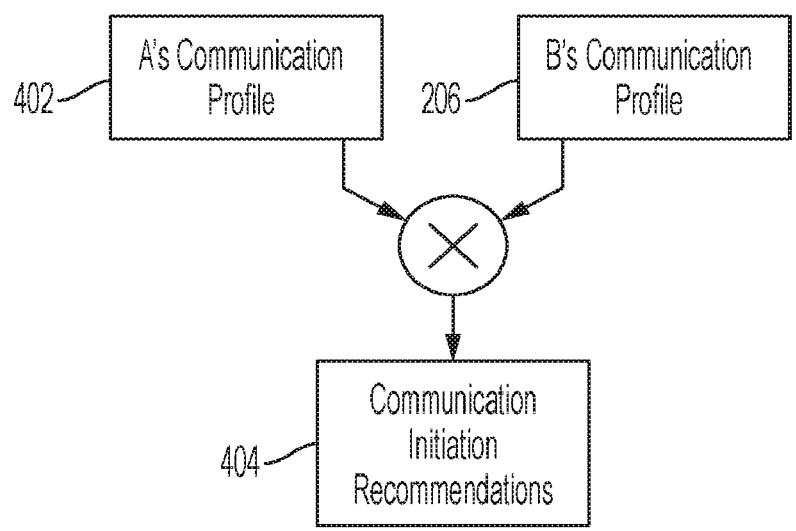
FIG. 4 illustrates using two profiles to generate communication initiation recommendations.

FIG. 4 illustrates using two profiles 402, 206 to generate communication initiation recommendations. While the recommendation system described herein is designed to assist in creating effective communication experiences, the intent is not for a user to "lose their voice," or for the system to generate speech for the user. Instead, the system can generate communication recommendations using the user's previous communications, such that the recommendations "sound" as if they came directly from the user, while still being tailored to the recipient. In this example, the system evaluates how a first person prefers to communicate 402 and how a second person prefers to receive communications 206. This can entail considering the vocabulary, syntax, context/topic, sentence length, or any other aspect of the user as contained in the respective user's communication profile. The system evaluates each person's profile, models proposed communications, ranks the likely effectivity of those proposed communications, and provides communication recommendations which, based on the system's modeling, are likely to elicit a positive response based on the user's goals.

Figure 5:
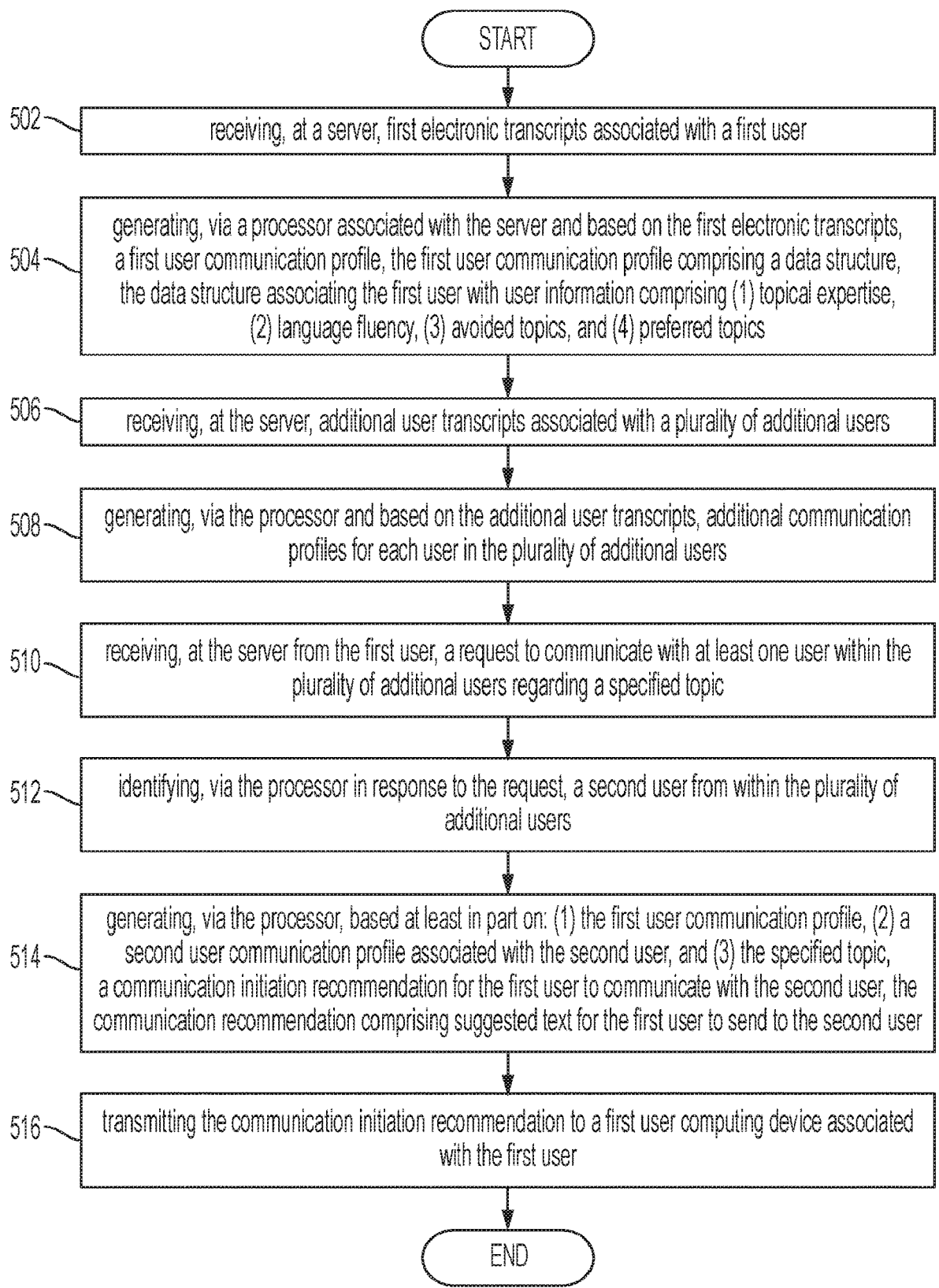
FIG. 5 illustrates an example method embodiment.

FIG. 5 illustrates an example method embodiment. The steps outlined herein are exemplary and can be implemented in any combination thereof, including combinations that exclude, add, or modify certain steps. As illustrated, the method includes receiving, at a server, first electronic transcripts associated with a first user (502). A processor associated with the server generates, based on the first electronic transcripts, a first user communication profile, the first user communication profile comprising a data structure, the data structure associating the first user with user information comprising (1) topical expertise, (2) language fluency, (3)

avoided topics, and (4) preferred topics (504). The server receives additional user transcripts associated with a plurality of additional users (506) and generates, via the processor and based on the additional user transcripts, additional communication profiles for each user in the plurality of additional users (508). The server receives, from the first user, a request to communicate with at least one user within the plurality of additional users regarding a specified topic (510) and identifies, via the processor in response to the request, a second user from within the plurality of additional users (512). The processor of the server generates, based at least in part on: (1) the first user communication profile, (2) a second user communication profile associated with the second user, and (3) the specified topic, a communication initiation recommendation for the first user to communicate with the second user, the communication recommendation comprising suggested text for the first user to send to the second user (514), and the server transmits the communication initiation recommendation to a first user computing device associated with the first user (516).

In some configurations, the identifying of the second user from within the plurality of additional users is based on a number of communications from the second user addressing the specified topic. For example, the system can identify communications from the second user, identify which of those communications are associated with the specified topic, and calculate the sum of those specific topic communications. Based on that sum, the second user can be selected (for example, if the user is within a top five number of contributors to the topic, he may be recommended within the plurality of additional users).

In some configurations, the method illustrated can further include transmitting, to the first user computing device, at least a portion of the second user communication profile. In such configurations, the method can also include receiving, from the second user before the transmitting of at least a portion of the second user communication profile to the first user computing device, an explicit approval for sharing the at least a portion of the second user communication profile.

In some configurations, the generating the first user communication profile, the second user communication profile, and the additional communication profiles can include use a semantic analysis of the first electronic transcripts and the additional user transcripts. The semantic analysis can identify parts of speech and/or syntax of the users within the respective transcripts. The generating of the communication initiation recommendation can further include using the semantic analysis for the additional user transcripts to generate an introduction likely to elicit a response from the second user. The system can identify when an introduction, or any other communication, is likely to elicit a response based on a statistical probability. For example, if the user is more likely than not (i.e., greater than 50%) going to respond, such probability can be communicated. Determining the likelihood of a response can be based on (as non-limiting examples) previous communications to the recipient and associated responses (or lack thereof), similar communications to similar recipients and those associated responses, and/or relationship between the respective parties.

In some configurations, the method illustrated in FIG. 5 can further include updating the first user communication profile and the additional communication profiles periodically. For example, the profiles can be updated on a daily or weekly basis. In other configurations, the system can update the first user communication profile and/or the additional communication profiles each time a new transcript or other communication is received from a respective user.

In some configurations, each of the first electronic transcripts and the additional user transcripts are received from at least one of: an email, a SMS (Short Message Service) message, a MMS (Multimedia Messaging Service) message, a collaboration message, and an audio transcript.

Figure 6:
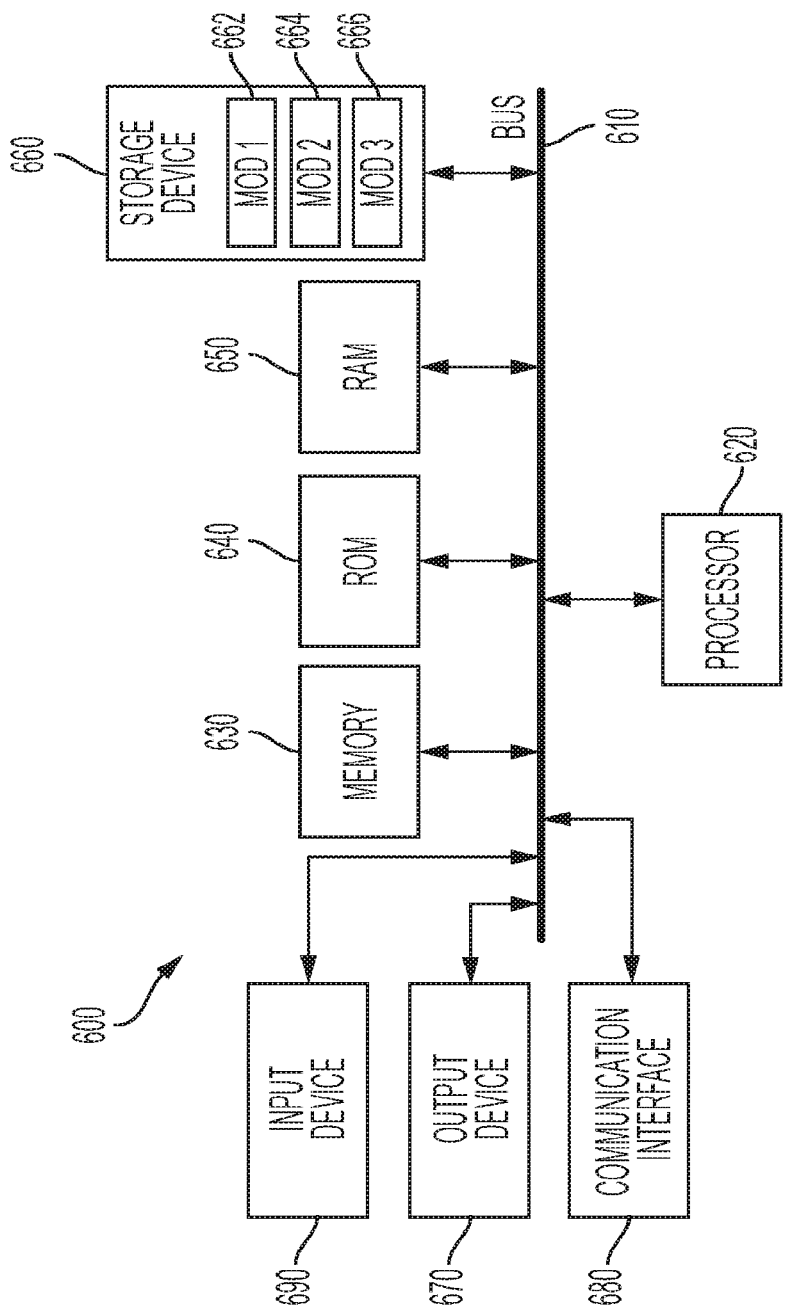
FIG. 6 illustrates an exemplary computer system.

FIG. 6 illustrates an example computer system. With reference to FIG. 6, an exemplary system includes a general-purpose computing device 600, including a processing unit (CPU or processor) 620 and a system bus 610 that couples various system components including the system memory 630 such as read-only memory (ROM) 640 and random access memory (RAM) 650 to the processor 620. The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A system comprising:
   in response to a request of a first user to communicate with at least one user, obtaining a first communication profile for the first user and a second communication profile for a second user, the first communication profile being generated based on first electronic transcripts associated with the first user, the second communication profile (i) being generated based on second electronic transcripts associated with the second user and (ii) indicating a syntax style corresponding to a favorable response rate of the second user;
   generating, based on the first and second communication profiles, suggested text in the syntax style corresponding to the favorable response rate of the second user, the suggested text being for a first message for the first user to communicate with the second user; and
   transmitting the first message comprising the suggested text in the syntax style to the first user.

2. The system of claim 1, wherein generating the suggested text in the syntax style comprises generating, based on the first and second communication profiles, the suggested text in accordance with a sentence length parameter corresponding to the favorable response rate of the second user.

3. The system of claim 1, wherein generating the suggested text in the syntax style comprises generating, based on the first and second communication profiles, the suggested text in the syntax style corresponding to a response rate of the second user that is greater than 50%.

4. The system of claim 1, wherein generating the suggested text in the syntax style comprises generating, based on the first and second communication profiles, the suggested text in the syntax style corresponding to a probability of a positive response of the second user greater than 50%.

5. A method comprising:
   obtaining a request of a first user to communicate with at least one user;
   obtaining a communication profile for a second user, the communication profile (i) being generated based on electronic transcripts associated with the second user and (ii) indicating a writing style corresponding to a favorable response rate of the second user;
   generating, based on the communication profile, suggested text in the writing style corresponding to the favorable response rate of the second user, the suggested text being for a first message for the first user to communicate with the second user; and
   causing presentation of the first message comprising the suggested text in the writing style to the first user.

6. The method of claim 5, wherein generating the suggested text in the writing style comprises generating, based on the communication profile, the suggested text in accordance with a sentence length parameter corresponding to the favorable response rate of the second user.

7. The method of claim 5, wherein generating the suggested text in the writing style comprises generating, based on the communication profile, the suggested text in the writing style corresponding to a response rate of the second user that is greater than 50%.

8. The method of claim 5, wherein generating the suggested text in the writing style comprises generating, based on the communication profile, the suggested text in the writing style corresponding to a probability of a positive response of the second user greater than 50%.

9. The method of claim 5, wherein generating the suggested text in the writing style comprises generating, based on the communication profile for the second user and at least one communication profile for the first user, the suggested text in the writing style corresponding to the favorable response rate of the second user, the at least one communication profile being generated based on one or more electronic transcripts associated with the first user.

10. The method of claim 5, further comprising:
    causing the suggested text to be presented on a user interface with other suggestions, the other suggestions (i) being in writing styles respectively corresponding to response rates of the second user and (ii) generated based on the communication profile and at least one communication profile for the first user, the at least one communication profile being generated based on one or more electronic transcripts associated with the first user.

11. The method of claim 5, wherein generating the communication profile comprises generating the communication profile based on timing information related to how quickly the second user responded to communications in the electronic transcripts.

12. The method of claim 5, wherein the suggested text comprises a conversation opener likely to elicit a response from the second user.

13. One or more non-transitory computer-readable media storing instructions that, when executed by one or more processors, cause operations comprising:
  obtaining a request of a first user to communicate with at least one user;
  obtaining a communication profile for a second user, the communication profile (i) being generated based on electronic transcripts associated with the second user and (ii) indicating a writing style corresponding to a favorable response rate of the second user;
  generating, based on the communication profile, suggested text in the writing style corresponding to the favorable response rate of the second user, the suggested text being for a first message for the first user to communicate with the second user; and
  causing presentation of the first message comprising the suggested text in the writing style to the first user.

14. The one or more non-transitory computer-readable media of claim 13, wherein generating the suggested text in the writing style comprises generating, based on the communication profile, the suggested text in accordance with a sentence length parameter corresponding to the favorable response rate of the second user.

15. The one or more non-transitory computer-readable media of claim 13, wherein generating the suggested text in the writing style comprises generating, based on the communication profile, the suggested text in the writing style corresponding to a response rate of the second user that is greater than 50%.

16. The one or more non-transitory computer-readable media of claim 13, wherein generating the suggested text in the writing style comprises generating, based on the communication profile, the suggested text in the writing style corresponding to a probability of a positive response of the second user greater than 50%.

17. The one or more non-transitory computer-readable media of claim 13, wherein generating the suggested text in the writing style comprises generating, based on the communication profile for the second user and at least one communication profile for the first user, the suggested text in the writing style corresponding to the favorable response rate of the second user, the at least one communication profile being generated based on one or more electronic transcripts associated with the first user.

18. The one or more non-transitory computer-readable media of claim 13, further comprising:
  causing the suggested text to be presented on a user interface with other suggestions, the other suggestions (i) being in writing styles respectively corresponding to response rates of the second user and (ii) generated based on the communication profile and at least one communication profile for the first user, the at least one communication profile being generated based on one or more electronic transcripts associated with the first user.

19. The one or more non-transitory computer-readable media of claim 13, wherein generating the communication profile comprises generating the communication profile based on timing information related to how quickly the second user responded to communications in the electronic transcripts.

20. The one or more non-transitory computer-readable media of claim 13, wherein the suggested text comprises a conversation opener likely to elicit a response from the second user.

\* \* \* \* \*